US011567203B2

(12) United States Patent
Müller et al.

(10) Patent No.: US 11,567,203 B2
(45) Date of Patent: Jan. 31, 2023

(54) LIGHT LINE TRIANGULATION APPARATUS

(71) Applicant: SICK AG, Waldkirch (DE)

(72) Inventors: Romain Müller, Stegen (DE); Florian Schneider, Reute (DE); Mattias Johannesson, Linköping (SE)

(73) Assignee: SICK AG, Waldkirch/Breisgau (DE)

( * ) Notice: Subject to any disclaimer, the term of this patent is extended or adjusted under 35 U.S.C. 154(b) by 369 days.

(21) Appl. No.: 16/815,339

(22) Filed: Mar. 11, 2020

(65) Prior Publication Data

US 2020/0292705 A1  Sep. 17, 2020

(30) Foreign Application Priority Data

Mar. 12, 2019 (EP) .................................. 19162183

(51) Int. Cl.
*G01S 17/48* (2006.01)
*G01B 11/25* (2006.01)
(Continued)

(52) U.S. Cl.
CPC .............. *G01S 17/48* (2013.01); *G01B 11/25* (2013.01); *G01J 4/00* (2013.01); *G06T 7/521* (2017.01); *G01J 2004/001* (2013.01); *G06T 2207/10028* (2013.01)

(58) Field of Classification Search
CPC ... G01J 4/00; G01J 2004/001; G01B 11/2522; G01B 11/25; G01S 17/48; G06T 7/521; G06T 2207/10028
See application file for complete search history.

(56) References Cited

U.S. PATENT DOCUMENTS 5,646,733 A     7/1997  Bieman
5,850,284 A *  12/1998  Schoeffler .............. G01N 21/21
                                                              356/369
(Continued)

FOREIGN PATENT DOCUMENTS

CN       105300273 A      2/2016
DE    102005014446 A1    10/2006
(Continued)

OTHER PUBLICATIONS

Xing-Fei He, Teledyne Dalse: "Focus on Polarization", Jul. 2016 issue of Photonics Spectra, Laurin Publishing.
(Continued)

*Primary Examiner* — Sang H Nguyen
(74) *Attorney, Agent, or Firm* — Nath, Goldberg & Meyer; Jerald L. Meyer; Stanley N. Protigal (57) ABSTRACT

The present invention relates to a light line triangulation apparatus with
  a measurement space for receiving a measurement object,
  a light projector, adapted to project a light line into the measurement space and/or onto the measurement object,
  an imager for detecting the light line in the measurement space, wherein the imager comprises imaging pixels arranged in a plurality of columns and rows. The apparatus of the invention is characterized in that the imager comprises multiple identical sets of polarization filters, wherein each set of polarization filters comprises at least two polarization filters with different polarization directions, wherein a respective polarization filter covers one of the columns.

13 Claims, 5 Drawing Sheets

(51) Int. Cl.
*G01J 4/00* (2006.01)
*G06T 7/521* (2017.01)

(56) References Cited

U.S. PATENT DOCUMENTS

| | | | | |
|---|---|---|---|---|
| 6,678,057 | B2 * | 1/2004 | Harding | G01N 21/9515 |
| | | | | 356/369 |
| 7,078,720 | B2 * | 7/2006 | Yamaguchi | G01S 17/89 |
| | | | | 356/3.01 |
| 7,742,640 | B1 * | 6/2010 | Carlson | G06V 10/145 |
| | | | | 382/173 |
| 8,760,517 | B2 * | 6/2014 | Sarwar | G06V 40/166 |
| | | | | 348/135 |
| 9,347,772 | B2 * | 5/2016 | Park | G01B 11/2513 |
| 2011/0050885 | A1 | 3/2011 | McEldowney | |
| 2012/0075432 | A1 * | 3/2012 | Bilbrey | G02B 30/25 |
| | | | | 348/48 |
| 2018/0100731 | A1 | 4/2018 | Pau | |
| 2018/0203249 | A1 * | 7/2018 | Filhaber | H04N 13/254 |
| 2018/0224270 | A1 | 8/2018 | Wolke et al. | |

FOREIGN PATENT DOCUMENTS

| | | |
|---|---|---|
| EP | 3236199 A1 | 10/2017 |
| JP | H8-29135 A | 2/1996 |
| WO | 2016/098400 A1 | 6/2016 |
| WO | 2018/211654 A1 | 11/2018 |

OTHER PUBLICATIONS

J. Clark, E. Trucco and H-F. Cheung: "Using Light Polarization in Laser Scanning", Department of Computing and Electrical Engineering, Heriot-Watt University, Edinburgh, Scotland, EH14 4AS, BMVC 1995 doi: 10.5244/C.9.52.

Teledyne DALSA: Piranha4 Polarization, Jun. 12, 2018, www.teledynedalsa.com/en/products/imaging/cameras/piranha4-polarization/.

Search Report dated May 27, 2019 issued in corresponding European Application No. 19162183.8.

Office Action issued in corresponding Japanese Application No. 2020-040592.

* cited by examiner

LIGHT LINE TRIANGULATION APPARATUS

FIELD

The present invention relates to a light line triangulation apparatus having a measurement space for receiving a measurement object and a light projector which is adapted to project a light line onto the measurement space and/or onto the measurement object. The apparatus further comprises an imager for detecting the light line in the measurement space, wherein the imager comprises imaging pixels arranged in a plurality of columns and rows.

BACKGROUND

Such light line triangulation apparatuses are used for a contactless determination of a contour of the measurement object. For determining the contour of the measurement object, the light projector projects the, preferably straight, light line onto the measurement object. The measurement object reflects the light from the light projector wherein the light reflected by the measurement object is detected by the imager. The imager is arranged distant from the light projector, thereby an angle of preferably below 90° is formed by the light projector, the measurement space and/or the measurement object and the imager. Due to said angle, it is possible to determine the contour of the measurement object based on triangulation.

The light line triangulation apparatus therefore allows a contactless determination of the contour of the measurement object. Such apparatuses are also known as light-section apparatuses or laser line triangulation apparatuses.

To correctly detect the contour of the measurement object, it is necessary to unambiguously identify the true position of the light line. However, direct reflections of the light line can locally saturate the pixels of the imager or be projected at wrong locations of the imager, thereby making the line analysis difficult if not impossible.

SUMMARY

It is therefore the object of the present invention, to provide a light line triangulation apparatus that allows mitigating the effects of direct reflections.

This object is satisfied by a light line triangulation apparatus having a measurement space for receiving a measurement object, a light projector projecting a light line into measurement space and/or onto a measurement object and and imager for detecting the light line in the measurement space.

The light line triangulation apparatus of the invention is characterized in that the imager comprises multiple identical sets of polarization filters, wherein each set of polarization filters comprises at least two polarization filters with different polarization directions, wherein a respective polarization filter covers one of the columns.

The invention is based on the insight that unwanted direct reflections (i.e. specular reflections) can be differentiated from the usually detected diffuse reflections by their polarization.

However, using e.g. only one polarization filter for the whole imager would only yield usable results if the measurement objects are known and therefore the polarization of the reflected light is known. Due to the at least two different polarization filters in each set of polarization filters, the invention allows to correctly determine the contour of unknown/different measurement objects. Furthermore, the fact that a respective polarization filter covers one of the columns, preferably a complete column, allows having the same polarization filter characteristics on the (complete) column. Thereby, the accuracy of the height detection (i.e. the accuracy of the detection of the contour of the measurement object) is not sacrificed for the benefit of detecting unwanted direct reflections.

In the light line triangulation apparatus, the sets of polarization filters are preferably repeated. This means that multiple sets of polarization filters are arranged on multiple columns of pixels of the imager.

The imager can comprise a rectangular array of pixels wherein preferably a respective column is covered by a respective polarization filter. If seen along a row, the polarization filter is preferably alternated after each pixel.

The term "covered" by a polarization filter should be understood that the light incident on pixels that are covered by a respective polarization filter has passed through the respective polarization filter. Thereby, different positions of the polarization filter are possible, e.g. somewhere in the beam path.

As mentioned above, the light line preferably is a straight line. Furthermore, the imager is arranged distant from the light projector, particularly in an angle between 10° and 80°, preferably in an angle of about 45°. The imager can comprise a camera and a lens, the lens focusing light from the measurement space and/or from the measurement object onto the pixels of the imager.

When no measurement object is present in the measurement space, the light line preferably is projected/reflected as a straight line onto the pixel of the imager. When the measurement object is then inserted into the measurement space, due to the height of the measurement object, the light line on the pixels of the imager is deviated. The deviation of the light line on the pixels is larger if the height of the measurement object is larger at a certain location of the measurement object.

Preferably, the apparatus is adapted to separately measure the deviation of the light line using the pixels (i.e. the reflected light line) at each column, thereby determining a plurality of height measurements for the measurement object. From the plurality of height measurements, a contour of the measurement object can then be derived.

Further advantageous embodiments of the invention will be apparent from the description, the Figures and the dependent claims.

According to one embodiment, each set of polarization filters comprises exactly four polarization filters having different polarization directions. Thus, each set of polarization filters can comprise a polarization filter #1, a polarization filter #2, a polarization filter #3 and a polarization filter #4. These four filters can be arranged on neighboring columns of the imager. Thus, if such a set of polarization filters is repeated, consecutive columns of the imager can be equipped with polarization filters of the following order: #1, #2, #3, #4, #1, #2, #3, #4, #1, #2, #3, . . .

In accordance with an embodiment, the polarization filters have (only) linear polarization, wherein the polarization direction of at least two polarization filters covering adjacent columns differs by an angle of 45°. The afore-mentioned set of polarization filters can have linear polarization with 0°, 45°, 90° and 135°. The values are valid for polarization filter #1, #2, #3 and #4, respectively. Using said angles of the polarization directions, allows the light line triangulation apparatus to determine the actual polarization at each location along the reflected light line with sufficient precision.

It is to be understood that also different numbers of polarization filters per set can be used. For example, only two filters, having polarization directions of each 0° and 90° could be used. Alternatively, also exactly six or eight filters per set could be used, wherein a set of eight filters could utilize polarization directions of 0°, 22,5°, 45°, 67,5°, 90°, 112,5°, 135°, 157,5°.

In accordance with a further embodiment, the light line triangulation apparatus comprises an evaluation unit, wherein the evaluation unit is adapted to combine pixel values of at least two, preferably of four, pixels of different columns in order to detect the position of the light line. Preferably, the evaluation unit combines at least one pixel per polarization filter for each polarization filter in the set of polarization filters. Further preferably, the combined pixels are arranged adjacent to each other in one row of pixels. A pixel value may represent a light intensity detected by the respective pixel. The combination of pixels may be a logical and/or mathematical combination. The combination of pixel values can also comprise a comparison of the pixel values. In other words, the polarization information gained by different pixels of different columns is used by the evaluation unit. With the polarization information, the evaluation unit can be adapted to determine the true position of the light line, wherein direct reflections (i.e. specular reflections) can be identified and then disregarded in evaluating the true position of the light line.

Therefore, the combined evaluation of pixel values of pixels of different columns allows disregarding false signals that are produced by direct reflections.

In accordance with one embodiment, the evaluation unit is adapted to subtract pixel values of different pixels that are covered by two different polarization filters, wherein the two different polarization filters preferably have a difference in polarization direction of 90°. By subtracting pixel values of pixels that are covered by polarization filters having a difference in polarization direction of 90°, components of the Stokes vector can be determined. The Stokes vector consists of four entries: S=(S0, S1, S2, S3), S0 refers to the total intensity, S1 and S2 to the linear polarization components (vertical and horizontal) and S3 to the circular polarization components. S3 is not further considered in the following description.

The calculation of components S0, S1 and S2 of the Stokes vector is now exemplarily described. For example, to calculate the S1 component, the intensity of a pixel that is covered by a polarization filter having a polarization direction of 90° (hereinafter denoted as I90) is subtracted from the pixel value of a pixel that is covered by a polarization filter having a polarization direction of 0° (hereinafter denoted as I0). Thus, S1=I0−I90.

Correspondingly, the component S2 of the Stokes vector can be calculated by subtracting the pixel value of a pixel being covered by a polarization direction of 135° (I135) from the pixel value of a pixel that is covered by a polarization filter having a polarization direction of 45° (I45). Thus, S2=I45 −I135.

The total intensity (S0) of the Stokes vector can be calculated as S0=I0+I90 or S0=I45+I135.

The evaluation unit can perform the above-mentioned subtractions and the calculation of S0.

The result values of S1 and S2 can be stored and/or displayed in a corresponding result map. The position of a result value can be the position of one of the pixels from which a pixel value has been used for the calculation of S1 or S2, respectively. Alternatively, the position can be an average of the position of all pixels used to calculate S1 or S2. The result values can be color-coded or greyscale-coded, thereby allowing a quick determination of different polarization behavior at different locations within the respective result map. The result map comprising the values for S1 can be denoted S1-map, whereas the result map showing the values for S2 can be denoted S2-map.

The evaluation unit can also be adapted to calculate result maps for different linear combinations of S1 and S2. Thereby it is possible to virtually rotate the polarization direction of the polarization filters.

Prior to storing and/or displaying the S1- and/or S2-map, intensity maps for each polarization direction can be stored and/or displayed. For example, an intensity map for all pixels that are covered by a polarization filter having a polarization direction of 0° can be generated (0°-map). The intensity map can also be color-coded to allow an easy recognition of the different locations of incident light on the imager. Also, the color-coding allows to easily recognize different intensity levels that are detected by the imager.

In accordance with a further embodiment, the evaluation unit is adapted to perform the subtraction within a moving window that is moved stepwise over the pixels of the imager. The moving window may be moved such that the window is moved forward one pixel at a time. After moving the window, the above-mentioned calculations can be performed again and the newly calculated result values can be included in the result maps. The moving window can comprise the same number of pixels as are covered by one set of polarization filters. For example, the moving window can comprise four pixels that are arranged in the same row.

According to an embodiment, a mechanical transport mechanism which is adapted to mechanically move the measurement object relative to the light line in a measurement direction is provided. In other words, the transport mechanism can move the measurement object such that different segments of the measurement object can be detected via the light line one after another. Thereby, the contour of different segments of the measurement object can be detected, wherein the evaluation unit can stitch together the different contours thereby calculating a three-dimensional model of the measurement object.

In order to allow the measurement object to be moved with sufficient speed along the measurement direction, a line frequency of preferably at least 50 kHz, further preferably at least 100 kHz, is used. In other words, all pixels of the imager are read out with a frequency of at least 50 kHz or 100 kHz, respectively. Preferably, the measurement direction is perpendicular to the light line. This arrangement of the measurement direction perpendicular to the light line, allows stepwise determining of the contour of the measurement object at all portions of the measurement object. The evaluation unit can then stitch together the different contours to determine a three-dimensional model of the measurement object.

Also due to the arrangement of the measurement direction perpendicular to the light line, the height at different locations of the measurement object can be determined with high accuracy, as different heights will result in a different shift of the reflected light line along the columns of the imager. The resolution regarding light of the imager is therefore equal to the distance of two pixels in the same column of the imager. In contrast, a part of the resolution of the location along the light line is sacrificed as e.g. four pixels are combined to evaluate the polarization information. This sacrifice has the advantage that erroneously detected portions of the light line due to direct reflections can be disregarded.

In other words, light from the light line incident on the imager may form a straight line on the imaging pixels, if no measurement object is present, wherein the reflected light line on the imager may be perpendicular to the direction defined by the columns. As mentioned before, a height difference of the measurement object results in a shift of the reflected light line along a column. Thus, the measurement direction and the columns are "parallel".

According to an embodiment, the light projector comprises a laser source, the laser source projecting the light line, wherein the light line is preferably formed by uniformly polarized light, i.e. laser light. The light line can also be termed a laser line. The uniform polarization facilitates the evaluation of the polarization state. For example, in case the measurement object is made of a metal, it may maintain the polarization of the incident light upon a direct reflection. Thereby, direct reflections can be detected based on their polarization, which may be identical to the polarization of the light line as produced by the laser source.

It is to be noted that different materials of the measurement object may result in completely different polarizations of the reflected light. For example, organic material may cause a shift or a rotation of the polarization direction. The polarization direction of the reflected light may also depend on the angle in which the light line is projected onto the measurement object.

According to an embodiment, at least some of or all of the polarization filters are directly bonded onto the imaging pixels. Thereby, the imager may be simple to produce, which can result in low production costs.

Alternatively, the polarization filters can be arranged in the beam path, particularly distant from the imaging pixels, e.g. in a lens unit of the imager.

According to an embodiment, the evaluation unit is adapted to determine the height of different portions of the measurement object based on the deformation of the light line. As mentioned above, the deformation of the light line allows using triangulation to determine the height of the different portions of the measurement objects.

The invention further relates to a method of detecting a height of different portions of a measurement object using light line triangulation. The method comprises:
 projecting a light line into a measurement space and/or onto a measurement object,
 detecting the light line with an imager, wherein the imager comprises multiple identical sets of polarization filters, wherein each set of polarization filters comprises at least two polarization filters with different polarization directions,
 detecting a height of different portions of the measurement object based on a deformation of the light line and based on polarization information.

The height can be determined for at least 100 or 200 different portions of the measurement object. Alternatively, the height can be determined at least for the number of columns of the imager divided by the number of polarization filters per set.

The advantages and preferable embodiments described herein with respect to the light line triangulation apparatus are also valid for the inventive method.

BRIEF DESCRIPTION OF THE DRAWINGS

The invention will now be described as an example with reference to the Figures.

DETAILED DESCRIPTION

Figure 1:
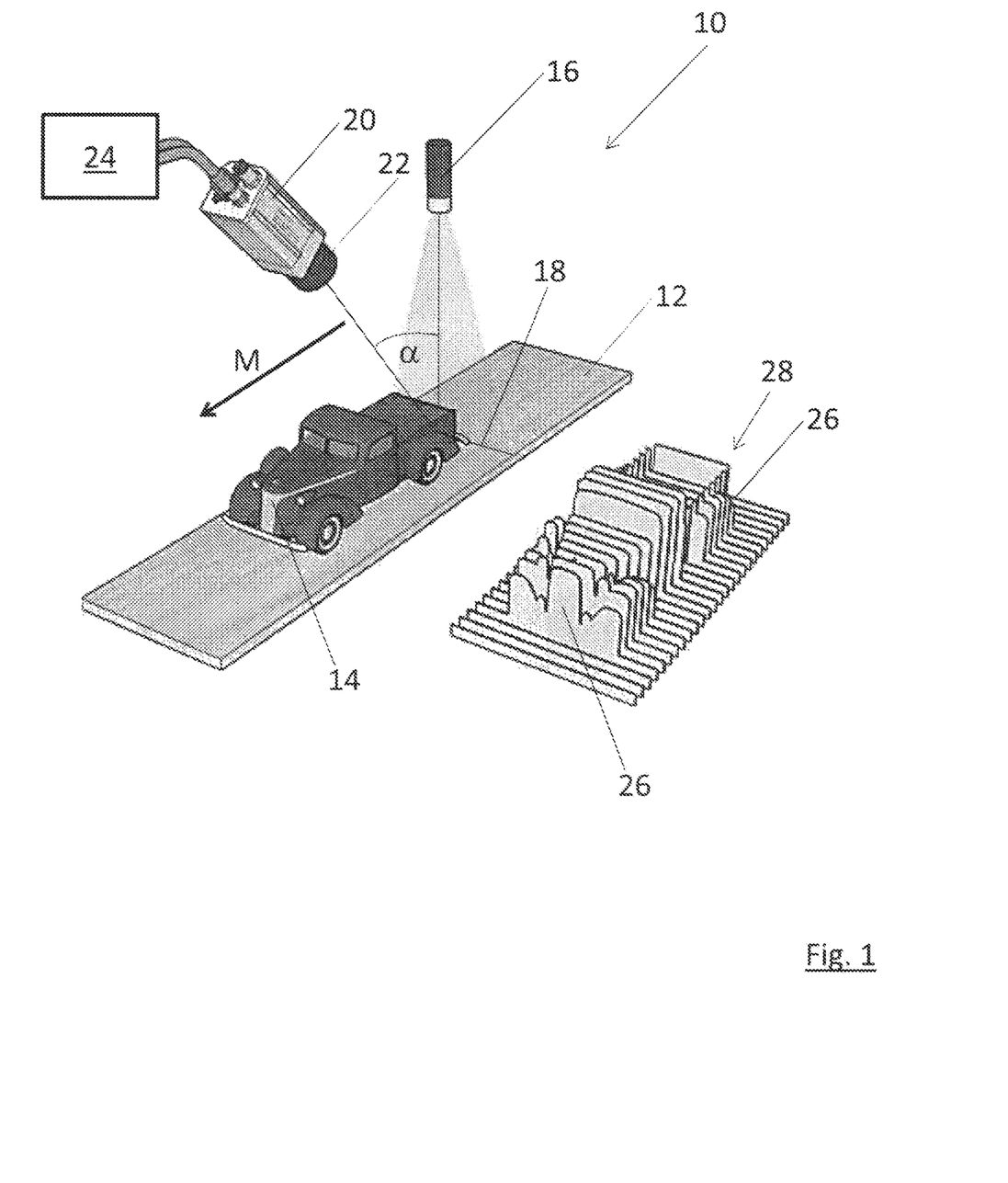
FIG. 1 shows an overview of a light line triangulation apparatus.

FIG. 1 shows a light line triangulation apparatus 10 which comprises a measurement space formed by the space above a conveyor belt 12. A measurement object in the form of a car 14 is placed on the conveyor belt 12 and is moved in a measurement direction M.

A light projector 16 comprising a laser source (not shown) projects a light line 18 onto the conveyor belt 12.

The light line 18 is monitored by an imager 20, the imager 20 comprises a lens 22 and is coupled to an evaluation unit 24.

The imager 20 is arranged distant from the light projector 16, wherein an angle α of around 45° is formed between the light projector 16 and the imager 20 at the light line 18.

When the measurement object, i.e. the car 14, is moved along the measurement direction M and reaches the light line 18, the light line 18 is deformed. The deformation of the light line 18 is then detected by the imager 20. From the detected deformation of the light line, a contour 26 of the car 14 can be determined. The contour 26 is shown on the right-hand side of FIG. 1. As the car 14 moves along the measurement direction M, a plurality of contours 26 can be determined. These contours 26 can be stitched together to form a 3D-model 28 of the car 14.

Figure 2:
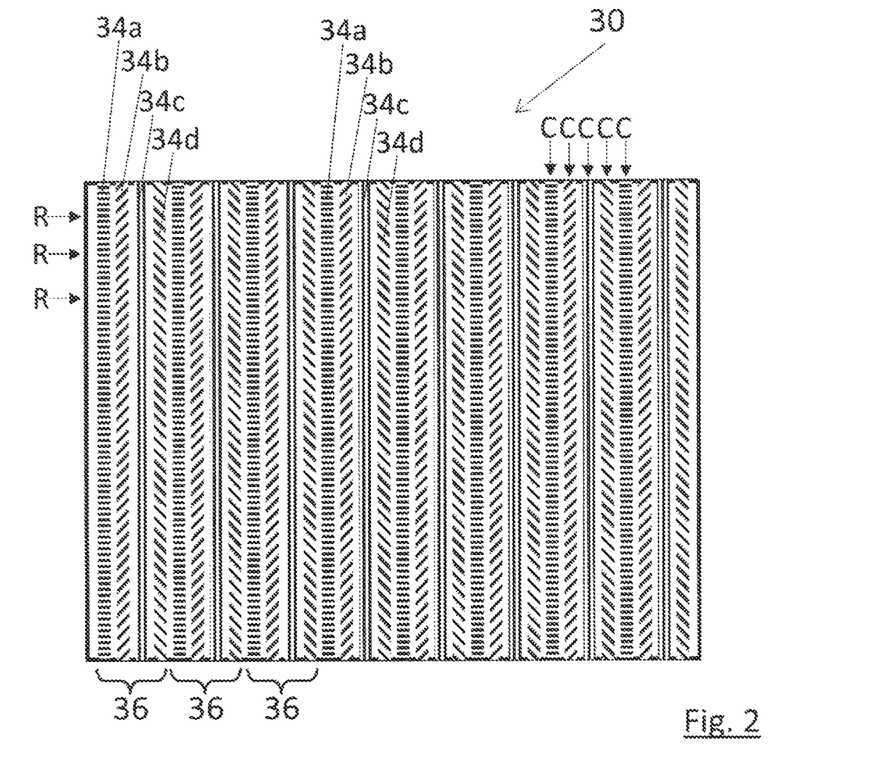
FIG. 2 shows an image sensor of an imager in a top view.

FIG. 2 shows an image sensor 30 of the imager 20. The image sensor 30 comprises a plurality of pixels 32 (FIG. 3) which are arranged in columns C and rows R. Arranged on the image sensor 30 are polarization filters 34 which are each covering a complete column C of pixels 32.

In case no measurement object is present, then the light line 18 is projected onto the image sensor 30 as a straight line that follows one of the rows R and is thus perpendicular to the direction of the columns C.

In the present example, four different polarization filters 34 are used, wherein a first polarization filter 34a has a polarization direction of 0°, a second polarization filter 34b has a polarization direction of 45°, a third polarization filter 34c has a polarization direction of 90° and a fourth polarization filter 34d has a polarization direction of 135°. The four polarization filters 34a, 34b, 34c, 34d form a filter set 36. Multiple filter sets 36 are arranged over the whole image sensor 30. Thereby, the filter set 36 described above is repeated multiple times.

Figure 3:
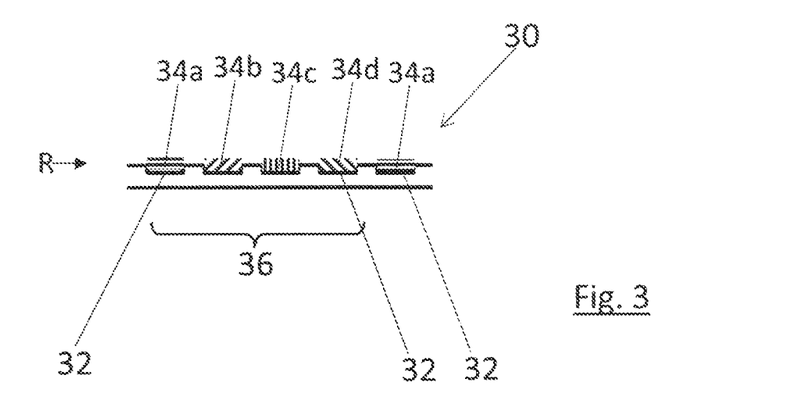
FIG. 3 shows the image sensor in a side section view.

FIG. 3 shows a sectional view of the image sensor 30. FIG. 3 shows multiple pixels 32 of different columns C but of the same row R, wherein the different polarization filters 34 are bonded onto the pixels 32.

Figure 4:
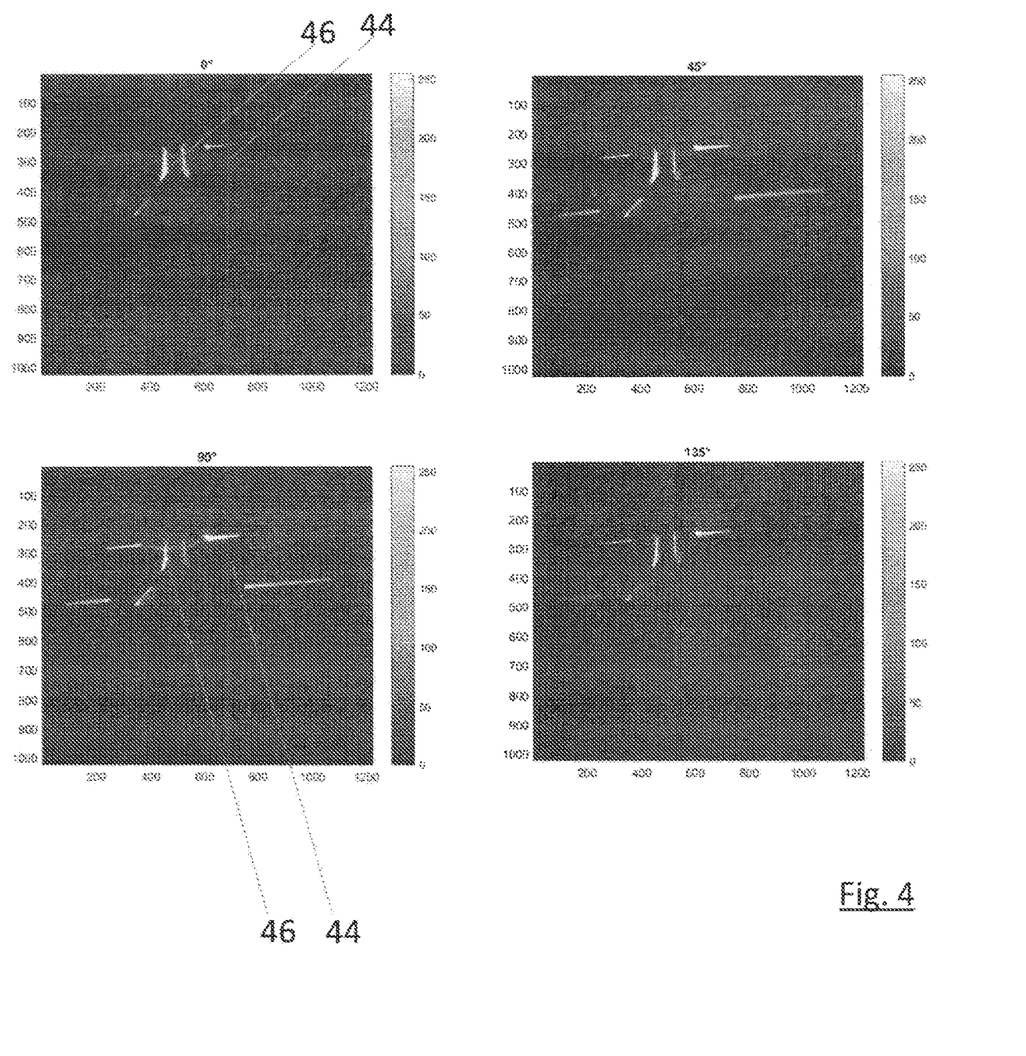
FIG. 4 shows the intensities detected for different polarization directions.
Figure 5:
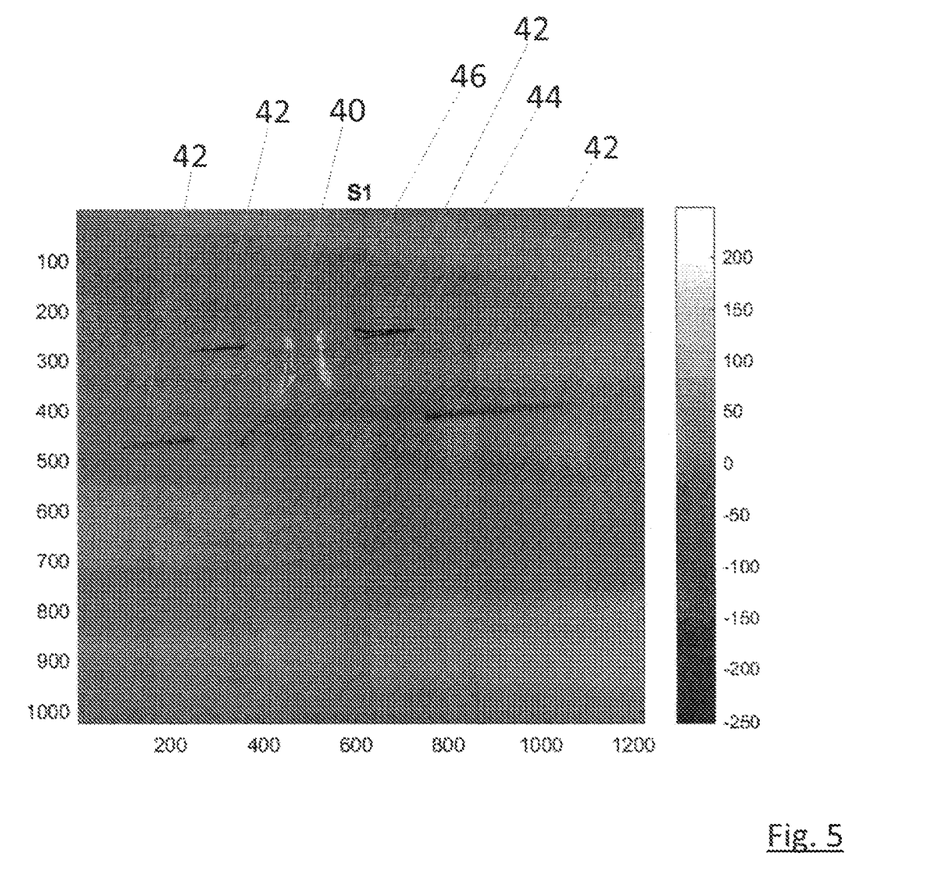
FIG. 5 shows a result map for Stokes vector S1.
Figure 6:
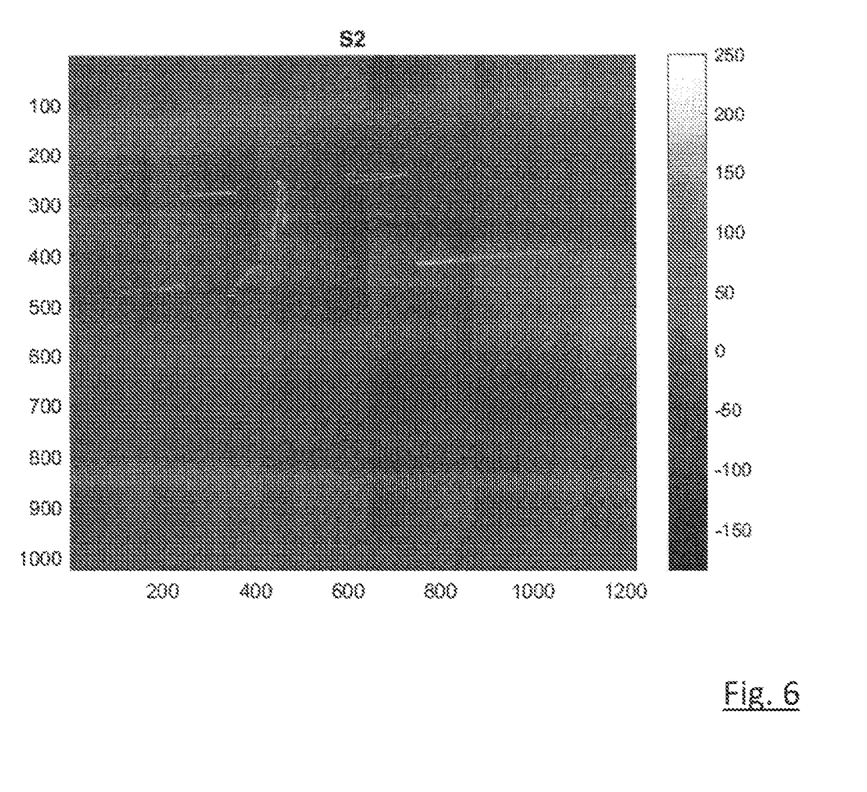
FIG. 6 shows a result map for Stokes vector S2.

FIGS. 4 to 6 show the results yielded during operation. The results are coded in greyscale to indicate intensity values or calculated values. In the example of FIGS. 4 to 6 a cuboid 44 having a V-shaped groove 46 was used as a measurement object. The polarization of the laser source was aligned to 0°.

It is to be noted that in the V-shaped groove 46 unwanted direct reflections occur. In contrast, the remaining form of the cuboid 44 usually produces "scattered light", i.e. diffuse reflections that are desired. Also, the V-shaped groove 46 may reflect the light from the light projector 16 onto further parts of the cuboid 44 or onto further parts of the V-shaped groove 46, which may then lead to an unwanted "displacement" of the light line 18 (from the point of view of the imager 20). However, this displacement can be detected using the polarization directions, as described herein.

FIG. 4 shows the resulting intensity values (i.e. pixel values) of pixels that are covered with a polarization filter having a polarization direction of 0°, 45°, 90° and 135°, respectively. In other words, FIG. 4 shows a 0°-map, a 45°-map, a 90°-map and a 135°-map. It can be seen, that e.g. the pixel intensities of 0° mostly show only the V-shaped groove 46, thus the unwanted direct reflections.

In contrast, the intensities for pixels covered with a 90° polarization filter 34 show both the V-shaped groove 46 as well as the cuboid 44 form.

In order to be able to distinguish between the unwanted direct reflections and the desired diffuse reflections the Stokes vectors S1 and S2 are calculated, wherein S1=I0−I90 and S2=I45−I135.

FIG. 5 shows the result map for Stokes vector S1 (S1-map) and FIG. 6 shows the result map for Stokes vector S2 (S2-map). It is apparent that in FIG. 6 the differences between the V-shaped groove 46 and the cuboid 44 form cannot be clearly determined as all resulting values are positive and in the range of >150. However, the result map for S1 shown in FIG. 5 clearly distinguishes the unwanted direct reflections 40 and the desired diffuse reflections 42. Both can be distinguished since the direct reflections 40 comprise values of approximately above 150 and the diffuse reflections 42 comprise values of approximately below −150.

It can thus be seen that the use of the polarization filters 34 allows clearly distinguishing unwanted direct reflections 40 from desired diffuse reflections 42. Thereby the form of the cuboid 44 can be correctly identified.

REFERENCE NUMERAL LIST 10 light line triangulation apparatus
12 conveyor belt
14 car
16 light projector
18 light line
20 imager
22 lens
24 evaluation unit
26 contour
28 3D-model
30 image sensor
32 pixel
34 polarization filter
36 filter set
38 result map
40 direct reflection
42 diffuse reflection
44 cuboid
46 V-shaped groove
M measurement direction
C column
R row
α angle

The invention claimed is:

1. A light line triangulation apparatus with
a measurement space for receiving a measurement object,
a light projector, adapted to project a light line (18) into the measurement space and/or onto the measurement object
an imager for detecting the light line in the measurement space, wherein the imager comprises imaging pixels arranged in a plurality of columns and rows,
wherein the imager comprises multiple identical sets (36) of polarization filters, wherein each set of polarization filters comprises at least two polarization filters (34) with different polarization directions,
wherein polarization filters with the same polarization filter characteristics cover respective ones of complete columns of pixels,
and wherein light from the light line incident on the imager forms a straight image line on the imaging pixels, if no measurement object is present, wherein the image line is peipendicular to the direction defined by the columns.

2. The light line triangulation apparatus of claim 1, wherein each set of polarization filters comprises exactly four polarization filters having different polarization directions.

3. The light line triangulation apparatus of claim 1, wherein the polarization filters have a linear polarization, wherein the polarization direction of at least two polarization filters covering adjacent columns differs by an angle of 45°.

4. The light line triangulation apparatus of claim 1, further comprising an evaluation unit adapted to combine pixel values of at least two pixels of different columns in order to detect the position of the light line.

5. The light line triangulation apparatus of claim 4, wherein the evaluation unit is adapted to combine pixel values of four pixels of different columns in order to detect the position of the light line.

6. The light line triangulation apparatus of claim 4, wherein the evaluation unit is adapted to subtract pixel values of different pixels that are covered by two different polarization filters having a difference in polarization direction of 90°.

7. The light line triangulation apparatus of claim 6, wherein the evaluation unit is adapted to perform the subtraction of the pixel values within a moving window that is moved stepwise over the pixels of the imager.

8. The light line triangulation apparatus of at claim 1, further comprising a transport mechanism which is adapted to move the measurement object relative to the light line in a measurement direction.

9. The light line triangulation apparatus of claim 1, wherein the light projector comprises a laser source, the laser source projecting the light line, wherein the light line.

10. The light line triangulation apparatus of claim 9, wherein the light line is formed by uniformly polarized light.

11. The light line triangulation apparatus of claim 1, wherein at least some of the polarization filters (34) are directly bonded onto the imaging pixels.

12. The light line triangulation apparatus of claim 1, further comprising an evaluation unit adapted to determine height of different portions of the measurement object based on the deformation of the light line.

13. A method of detecting height of different portions of a measurement object using light line triangulation, the method comprising:
projecting a light line into a measurement space and/or onto a measurement object,
detecting the light line with an imager, wherein the imager comprises multiple identical sets of polarization filters, wherein each set of polarization filters comprises at least two polarization filters with different polarization directions and polarization filters with the same polarization filter characteristics respective ones of complete columns of pixels, wherein light from the light line incident on the imager forms a straight image line on the imaging pixels, if no measurement object is present, wherein the image line is perpendicular to the direction defined by the columns, detecting the height of different portions of the measurement object is detected based on a deformation of the light line and based on polarization information.

\* \* \* \* \*